(12) United States Patent
Wu et al.

(10) Patent No.: US 11,676,294 B2
(45) Date of Patent: Jun. 13, 2023

(54) PASSIVE AND SINGLE-VIEWPOINT 3D IMAGING SYSTEM

(71) Applicants: William Marsh Rice University, Houston, TX (US); Carnegie Mellon University, Pittsburgh, PA (US)

(72) Inventors: Yicheng Wu, Houston, TX (US); Vivek Boominathan, Houston, TX (US); Huaijin Chen, Houston, TX (US); Aswin C. Sankaranarayanan, Pittsburgh, PA (US); Ashok Veeraraghavan, Houston, TX (US)

(73) Assignees: William Marsh Rice University, Houston, TX (US); Carnegie Mellon University, Pittsburgh, PA (US)

( * ) Notice: Subject to any disclaimer, the term of this patent is extended or adjusted under 35 U.S.C. 154(b) by 324 days.

(21) Appl. No.: 16/865,229

(22) Filed: May 1, 2020

(65) Prior Publication Data
US 2020/0349729 A1    Nov. 5, 2020

Related U.S. Application Data

(60) Provisional application No. 62/841,566, filed on May 1, 2019.

(51) Int. Cl.
| | |
|---|---|
| *G06T 7/55* | (2017.01) |
| *H04N 13/122* | (2018.01) |
| *H04N 13/111* | (2018.01) |
| *H04N 13/128* | (2018.01) |
| *H04N 13/229* | (2018.01) |

(52) U.S. Cl.
CPC .............. *G06T 7/55* (2017.01); *H04N 13/111* (2018.05); *H04N 13/122* (2018.05); *H04N 13/128* (2018.05); *H04N 13/229* (2018.05); *G06T 2200/08* (2013.01)

(58) Field of Classification Search
CPC ....... G06T 2200/08; G06T 2207/20084; G06T 7/529; G06T 7/55; G06T 7/571; H04N 13/111; H04N 13/122; H04N 13/128; H04N 13/229; H04N 2013/0081
USPC ............................................. 382/154; 348/42
See application file for complete search history.

(56) References Cited

U.S. PATENT DOCUMENTS

| | | | | |
|---|---|---|---|---|
| 2002/0131052 | A1* | 9/2002 | Emery | ...................... G03F 1/72 73/602 |
| 2018/0307132 | A1* | 10/2018 | Zhang | ................. G01N 21/6458 |
| 2021/0141205 | A1* | 5/2021 | Kleppe | ................. G02B 21/361 |
| 2021/0142170 | A1* | 5/2021 | Ozcan | ................. G02B 27/4205 |

OTHER PUBLICATIONS

Timo Gissibl, Michael Schmid, and Harald Giessen, "Spatial beam intensity shaping using phase masks on single-mode optical fibers fabricated by femtosecond direct laser writing," Optica 3, 448-451 (2016) (Year: 2016).*

* cited by examiner

*Primary Examiner* — Christopher S Kelley
*Assistant Examiner* — Ana Picon-Feliciano
(74) *Attorney, Agent, or Firm* — Osha Bergman Watanabe & Burton LLP

(57) ABSTRACT

A method for a passive single-viewpoint 3D imaging system comprises capturing an image from a camera having one or more phase masks. The method further includes using a reconstruction algorithm, for estimation of a 3D or depth image.

17 Claims, 15 Drawing Sheets

PASSIVE AND SINGLE-VIEWPOINT 3D IMAGING SYSTEM

CROSS-REFERENCE TO RELATED APPLICATIONS

This Application claims the benefit of U.S. Provisional Application 62/841,566 filed on May 1, 2019.

STATEMENT REGARDING FEDERALLY SPONSORED RESEARCH OR DEVELOPMENT

This invention was made with Government Support under Grant Numbers IIS-1652633, CCF-1527501 and CCF-1730574 awarded by the National Science Foundation and Grant Number HR0011-17-C-0026 awarded by the Defense Advanced Research Projects Agency. The government has certain rights in this invention.

REFERENCE TO A COMPACT DISK APPENDIX

Not applicable.

BACKGROUND OF INVENTION

3D Imaging is critical for a myriad of applications such as autonomous driving, robotics, virtual reality, and surveillance. Image sensors capture 2D intensity information. Therefore, estimating the 3D geometry of the actual world from one or multiple 2D images is an essential problem in optics and computer vision. Over the last decades, numerous approaches were proposed for 3D imaging. The current state of art relies on active illumination based techniques such as LIDAR, radar, structured illumination or continuous-wave time-of-flight. However, many emerging applications, especially on mobile platforms, are severely power and energy constrained. Active approaches are unlikely to scale well for these applications and hence, there is a pressing need for robust passive 3D imaging technologies. Multi-camera systems provide state of the art performance for passive 3D imaging. Unfortunately, having multiple cameras within a single platform results in increased system cost as well as implementation complexity.

SUMMARY OF INVENTION

In one aspect, embodiments disclosed herein generally relate to a method for a passive single-viewpoint 3D imaging system comprises capturing an image from a camera having one or more phase masks. The method further includes using a reconstruction algorithm, for estimation of a 3D or depth image.

In another aspect, embodiments disclosed herein relate to a system for a passive and single-viewpoint 3D imaging system. The system includes a camera and an optimized phase mask placed in an aperture plane of the camera. In addition, the optimized phase mask and a reconstruction algorithm allow the system to estimate a 3D or depth image.

In another aspect, embodiments disclosed herein relate to a non-transitory computer readable medium storing instructions. The instructions are executable by a computer processor and include functionality for building a differentiable forward model with an optical layer and a reconstruction network. The optical layer is a physics-based model which simulates a plurality of coded images captured on a sensor with a phase mask. The reconstruction network is a neural network which produces a depth map from the coded images. The instructions further include training a framework with a red green blue depth (RGBD) dataset to optimize a height map of the phase mask and parameters in the neural network, fabricating an optimal phase mask using photolithography method and placing in an aperture plane of a camera. In addition the instructions include calibrating a plurality of point spread functions (PSFs) at different depths, simulating the plurality of coded images with the calibrated PSFs to fine-tune the neural network, and recovering the corresponding depth map by capturing and passing a plurality of images through the neural network.

Other aspects and advantages of one or more embodiments disclosed herein will be apparent from the following description and the appended claims.

DETAILED DESCRIPTION

Figure 1:
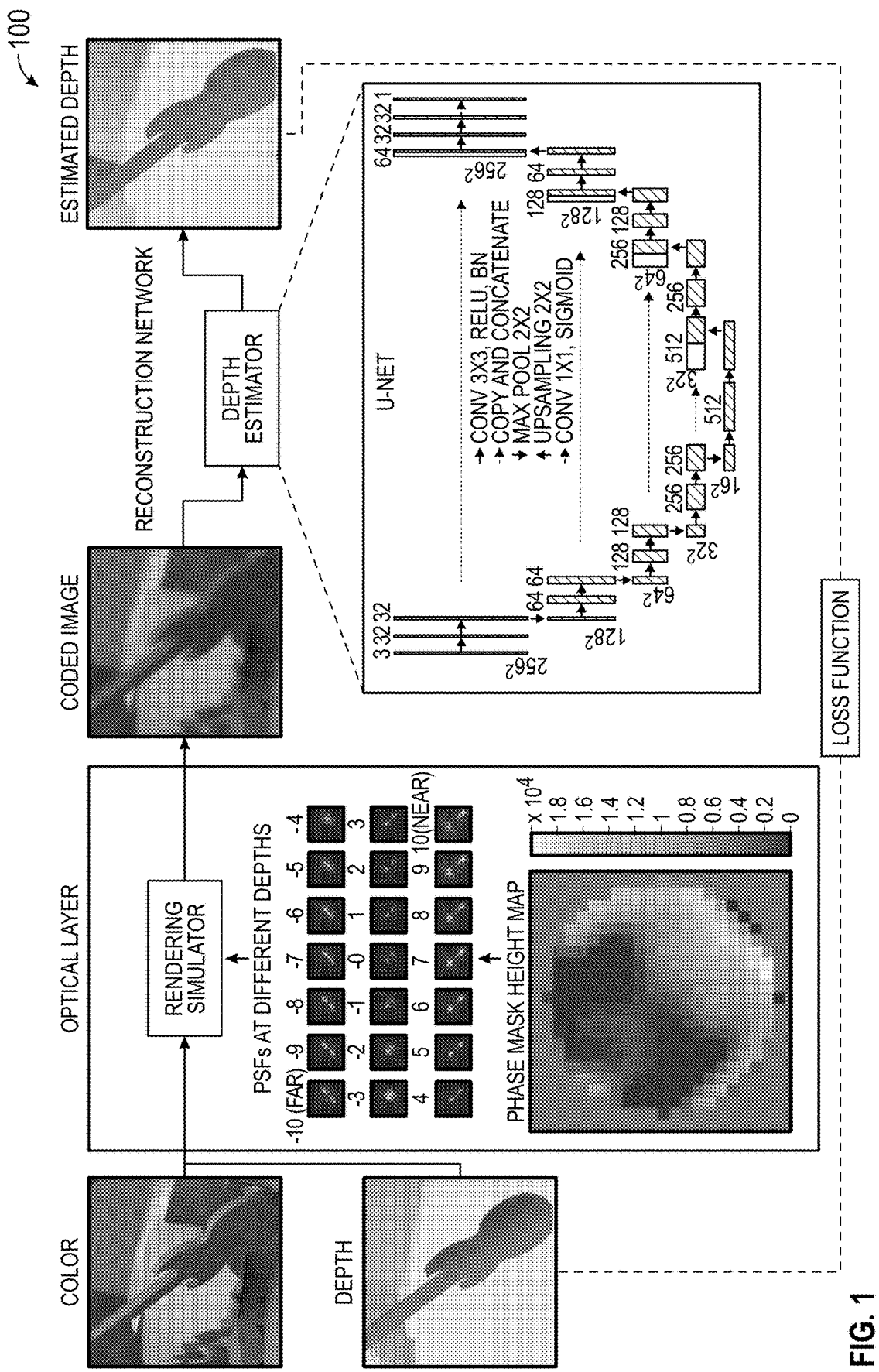
FIG. 1 is a schematic overview of end-to-end architecture framework of a system in accordance with one or more embodiments.

Specific embodiments will now be described in detail with reference to the accompanying figures Like elements in the various figures are denoted by like reference numerals for consistency.

In the following detailed description of embodiments, numerous specific details are set forth in order to provide a more thorough understanding.

However, it will be apparent to one of ordinary skill in the art that embodiments may be practiced without these specific details. In other instances, well-known features have not been described in detail to avoid unnecessarily complicating the description.

In the following description, any component described with regard to a figure, in various embodiments of the present disclosure, may be equivalent to one or more like-named components described with regard to any other figure.

For brevity, at least a portion of these components are implicitly identified based on various legends. Further, descriptions of these components will not be repeated with regard to each figure. Thus, each and every embodiment of the components of each figure is incorporated by reference and assumed optionally present within every other figure having one or more like-named components. Additionally, in accordance with various embodiments of the present disclosure, any description of the components of a figure is to be interpreted as an optional embodiment, which may be implemented in addition to, in conjunction with, or in place of the embodiments described with regard to a corresponding like-named component in any other figure. In the figures, black solid collinear dots indicate that additional components similar to the components before and/or after the solid collinear dots may optionally exist.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements, if an ordering exists.

The term data structure is understood to refer to a format for storing and organizing data.

I. Introduction

Current depth sensors fall into two groups. Active-illumination-based systems like structured light and time of flight requires additional power expenditure. Stereo or multicamera systems are bulky and hard to calibrate. Multicamera systems provide state of the art performance for passive 3D imaging. In these systems, triangulation between corresponding points on multiple views of the scene allows for 3D estimation. Unfortunately, having multiple cameras within a single platform results in increased system cost as well as implementation complexity.

Coded-aperture-based systems offer the possibility to passively measure depth information from a single camera. Traditional design pipeline follows stepwise procedure. First, optical elements (e.g., phase mask) are designed to encode the depth information in point spread functions (PSFs). Then, an independent reconstruction algorithm is designed to estimate depth.

Deep learning has now been used as a tool for end-to-end optimization of the imaging system. The key idea is to model the optical imaging formation models as parametric neural network layers, connect those layers with the application layers (i.e., image recognition, reconstruction, etc.) and finally use back-propagation to train on a large dataset to update the parameters in optics design. However, the recent developed frameworks are not entirely end-to-end, since a separate depth classification algorithm besides the reconstruction network learns their phase mask, and the gradient back-propagation is performed individually for each network. Such a framework limits their ability to find the optimal mask for depth estimation.

The present disclosure may provide a passive, single-viewpoint 3D imaging system PhaseCam3D. One or more embodiments of the present disclosure exploit the emerging computational imaging paradigm, wherein the optics and the computational algorithm are co-designed to maximize performance within operational constraints. In one or more embodiments, the entire system may optimize the mask and the reconstruction algorithm via end-to-end training of a neural network with the exclusive goal of maximizing depth estimation performance. After the training process, the optimal mask is fabricated using photolithography and inserted into a camera system. Further, in some embodiments the system may use a statistical-information-theory-motivated initialization of the phase mask in the network to achieve the best performing phase mask design. In some embodiments, the data-driven method of the one or more embodiments may be able to handle challenging scenes, which contains non-texture regions or transparent objects.

It is well known in the art that the depth-dependent defocus 'bokeh' PSF depends on the amplitude and phase of the aperture used. One or more embodiments of the present disclosure exploit recent advances in deep learning to develop an end-to-end optimization technique to optimize a mask on the aperture plane with the exclusive goal of maximizing depth estimation performance.

In some embodiments, the PhaseCam3D is single-view and single-shot, therefore, has much lower cost and energy consumption. Moreover, even though phase mask based depth estimation relies on textures in the scene for depth estimation as well, PhaseCam3D's may use the data-driven reconstruction network to provide depth estimation with implicit prior statistics and interpolation from the deep neural networks. PhaseCam3D may use novel phase mask to help with the depth estimation, and the phase mask-based approach provides several advantages compared to amplitude mask: First, unlike the amplitude masks that block the light, phase masks bend light, thus has much higher light throughput, and consequently delivers lower noise level. Secondly, the goal of designing the mask-based imaging system for depth estimation is to make the PSFs of different depth to have maximum variability. Even though the PSFs of amplitude mask-based system are depth dependent, the difference in PSFs across depth is only in scale. On the contrary, phase masks produce PSFs with much higher depth dependent variability. As a result, the phase mask should help distinguish the depth better in theory and the feature size may be made smaller. Lastly, the phase mask also preserves cross-channel color information, which could be useful for reconstruction algorithms.

FIG. 1 shows a schematic overview of end-to-end architecture framework of a system in accordance with one or more embodiments. FIG. 1 shows a system 100 wherein the aperture mask and the reconstruction algorithm (in terms of the network parameters) for depth estimation are simultaneously optimized. One or more embodiments of the present disclosure model light propagation from the scene to the sensor, including the modulation by the mask as front-end layers of a deep neural network. Thus in the system 100, the first layer corresponds to physical optical elements. All subsequent layers of our network are digital layers and represent the computational algorithm that reconstructs depth images. One or more embodiments of the present disclosure may run the back-propagation algorithm to update this network, including the physical mask, end-to-end.

In some embodiments, the end-to-end architecture of system 100 may consist of two parts an optical layer 106 and a reconstruction network 108. The system 100 may further include a rendering simulator 116, coded image 118, a depth estimator 120, an estimated depth 122, and a loss function 110. Both parameters in the optical layer, as well as the reconstruction network, are optimized based on the loss defined in the loss function 110 between the estimated depth 122 and ground truth depth (depth 104).

Figure 2:
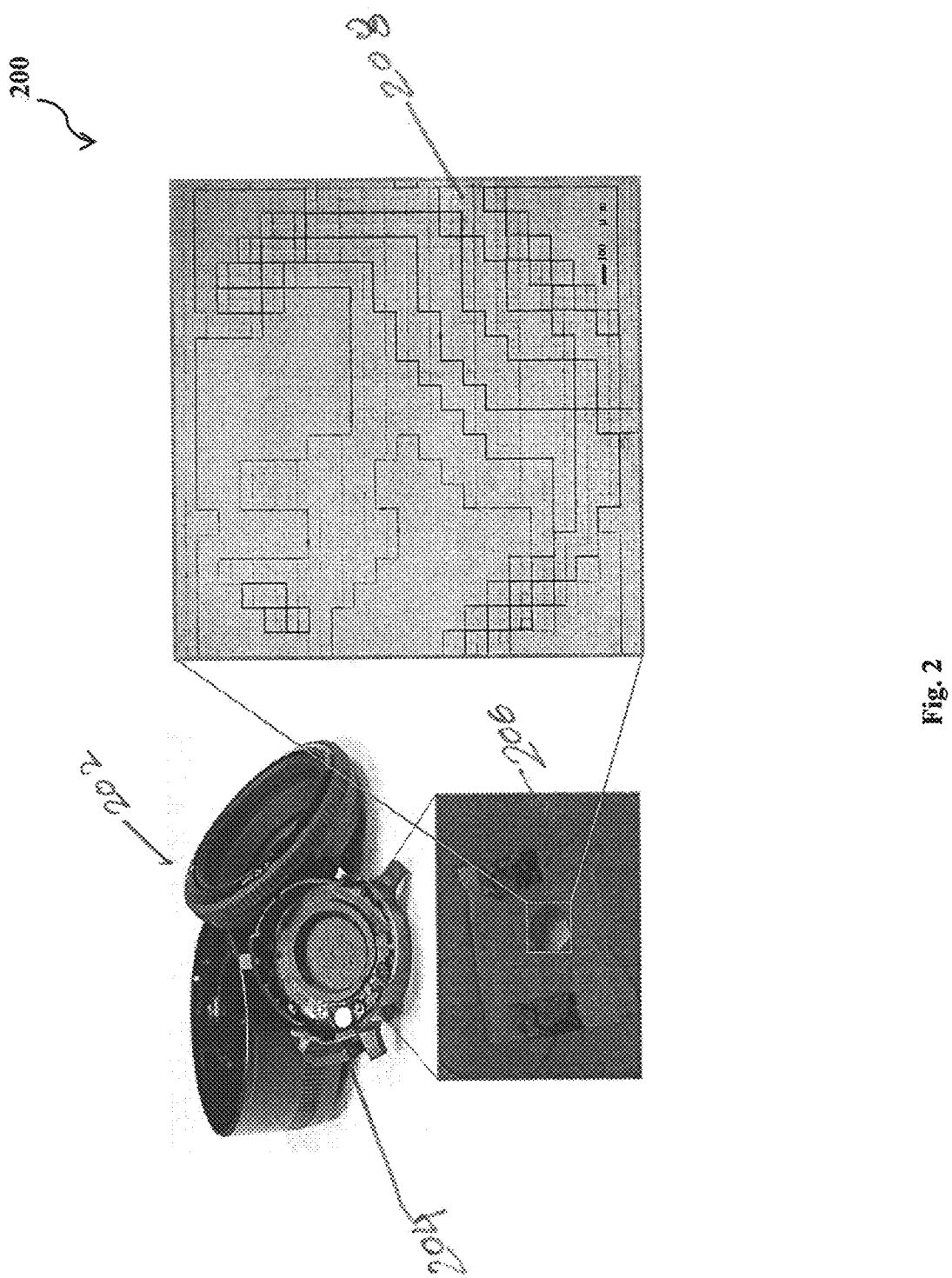
FIG. 2 shows a fabricated phase mask in accordance with one or more embodiments.

FIG. 2 shows a fabricated phase mask in accordance with one or more embodiments. Once the network is trained, the parameters of the front-end provide the optimized phase mask 206. On fabricating this optimized phase mask 206, it is placed in the aperture plane 204 of a conventional camera 202 to realize our 3D imaging system, as shown in FIG. 2. The parameters of the back-end provide a highly accurate reconstruction algorithm, to recover the depth image from the captured data. In some embodiments, a single optical element assembly may be fabricated that accomplishes the task of both the main lens and the phase mask simultaneously. This would especially be the case for mobile platforms, where custom fabricated plastic lenses are the de-facto norm. FIG. 2 shows a 2.835 mm diameter phase mask fabricated by photolithography and attached on the back side of the lens aperture. The image on the right shows a close-up image 208 of the fabricated phase mask 206 taken using a 2.5× microscope objective.

II. Phasecam3D Framework

Referring to FIG. 1, the optical layer 106 with a phase mask height map 112 as learnable parameter, a physics-based model first simulates depth dependent PSFs 114, and then applies these PSFs to red green blue depth (RGB-D) input to formulate the coded image on the sensor. The optical layer 106 takes in as input an all-in-focus image and a corresponding depth map and outputs a physically-accurate coded intensity image. The reconstruction network 108 is a U-Net based deep network to reconstruct the depth map from the coded image. During the training, the RGB all-in-focus image and the corresponding ground truth depth are provided. The optical layer 106 takes this RGB-D input and generates the simulated sensor image. This phase-modulated image is then provided as input to the reconstruction network 108, which outputs the estimated depth 122. Finally, the loss between the estimated depth 122 from the depth estimator 120 and ground truth depth from the depth 104 is calculated at the loss function 110. From the calculated loss, the gradient is back-propagated to update both the reconstruction network 108 and the optical layer 106. As a result, the parameters in the reconstruction network, as well as the phase mask design, are updated. The components of the system 100 are described below in detail.

A. Optical Layer

To simulate the system accurately, the system 100 may be modeled based on Fourier optics theory, which takes account for diffraction and wavelength dependence. To keep the consistency with natural lighting conditions, the light source may be incoherent. The optical layer simulates the working of a camera with a phase mask in its aperture plane. Given the phase mask, describes as a height map, the pupil function induced by it may be defined first to calculate the point spread function on the image plane and render the coded image produced by it given an RGBD image input.

a) Pupil function: Since the phase mask is placed on the aperture plane, the pupil function is the direct way to describe the forward model. The pupil function is a complex-valued function of the 2D coordinates $(x_1, y_1)$ describing the aperture plane.

$$P(x_1,y_1)=A(x_1,y_1)\exp[i\varphi(x_1,y_1)] \quad (1)$$

The amplitude $A(\cdot,\cdot)$ is constant within the disk aperture and zero outside since there is no amplitude attenuation for phase masks. The phase $\varphi$ has two components from the phase mask and defocus.

$$\varphi(x_1,y_1)=\varphi^M(x_1,y_1)+\varphi^{DF}(x_1,y_1) \quad (2)$$

$\varphi^M(x_1,y_1)$ is the phase modulation caused by height variation on the mask.

$$\varphi^M(x_1,y_1)=k_\lambda \Delta n h(x_1,y_1) \quad (3)$$

$\lambda$ is the wavelength, $k_\lambda = 2\pi/\lambda$ is the wave vector, and $\Delta n$ is the reflective index difference between air and the material of the phase mask. The material used for our phase mask has little refractive index variations in the visible spectrum; so, $\Delta n$ is kept as a constant. h denotes the height map of the mask learned in the optical layer.

The term $\varphi^{DF}(x_1,y_1)$ is the defocus aberration due to the mismatch between in-focus depth $z_0$ and the actual depth z of a scene point. The analytical expression for $\varphi^{DF}(x_1,y_1)$ is given as $$\phi^{DF}(x_1,y_1) = k_\lambda \frac{x_1^2 + y_1^2}{2}\left(\frac{1}{z} - \frac{1}{z_0}\right) = k_\lambda W_m r(x_1,y_1)^2, \quad (4)$$

where, $r(x_1,y_1)=\sqrt{x_1^2+y_1^2}/R$ is the relative displacement, R is the radius of the lens aperture, and $W_m$ is defined as $$W_m = \frac{R^2}{2}\left(\frac{1}{z} - \frac{1}{z_0}\right) \quad (5)$$

$W_m$ combines the effect from the aperture size and the depth range, which is a convenient indication of the severity of the focusing error. For depths that are closer to the camera than the focal plane, $W_m$ is positive. For depths that are further than the focal plane, $W_m$ is negative.

b) PSF induced by the phase mask: For an incoherent system, the PSF is the squared magnitude of the Fourier transform of the pupil function.

$$PSF_{\lambda,W_m}(x_2,y_2)=|F\{P_{\lambda,W_m}(x_1,y_1)\}|^2 \quad (6)$$

The PSF is dependent on the wavelength of the light source and defocus. In the numerical simulations, the broadband color information in the training datasets—characterized as red (R), blue (B) and green (G) channels—are approximated by three discretized wavelengths, 610 nm (R), 530 nm (G) and 470 nm (B), respectively.

c) Coded image formulation: If the scene is comprised of a planar object at a constant depth from the camera, the PSF is uniform over the image, and the image rendering process is just a simple convolution for each of the color channels. However, most real-world scenes contain depth variations, and the ensuing PSF is spatially varying. While there are plenty of algorithms to simulate the depth-of-field effect, four fundamental properties are required to be satisfied. First, the rendering process has to be physically accurate and not just photo-realistic. Second, it should have the ability to model arbitrary phase masks and the PSF induced by them, rather than assuming a specific model on the PSF (e.g., Gaussian distribution). Third, since the blurring process will be one part of the end-to-end framework, it has to be differentiable. Fourth, this step should be computationally efficient because the rendering process needs to be done for each iteration with updated PSFs.

In one or more embodiments, the method is based on the layered depth of field model. The continuous depth map is discretized based on $W_m$. Each layer is blurred by its corresponding PSF calculated from (6) with a convolution. Then, the blurred layers are composited together to form the image.

$$I_\lambda^B(x_2, y_2) = \sum_{W_m} I_{\lambda,W_m}^S(x_2, y_2) \otimes PSF_{\lambda,W_m}(x_2, y_2) \qquad (7)$$

This approach does not model the occlusion and hence, the rendered image is not accurate near the depth boundaries due to intensity leakage; however, for the most part, it does capture the out-of-focus effect correctly. Fine-tuning of the one or more embodiments to reduce the error at boundaries will be discussed later. To mimic noise during the capture, Gaussian noise to the image is applied. A smaller noise level will improve the performance during the reconstruction but also makes the model to be more sensitive to noise. In the simulation, the standard deviation is set at $\sigma=0.01$.

B. Depth Reconstruction Network

In one or more embodiments, there are a variety of networks to be applied for depth estimation task. Here, the U-Net is adopted since it is widely used for pixel-wise prediction. The network illustrated in FIG. 1 is an encoder-decoder architecture. The input to the network is the coded image with three color channels. The encoder part consists of the repeated application of two 3×3 convolutions, each followed by a rectified linear unit (ReLU) and a batch normalization (BN). At each downsampling step, the resolution is halved using a 2×2 max pooling operation with stride 2 and double the number of feature channels. The decoder part consists of an upsampling of the feature map followed by a 2×2 convolution that halves the number of feature channels and two 3×3 convolutions, each followed by a ReLU and a BN. Concatenation is applied between the encoder and decoder to avoid the vanishing gradient problem. At the final layer, a 1×1 convolution is used with a sigmoid to map each pixel to the given depth range.

During the training, the input image size is 256×256. But the depth estimation network in one or more embodiments may run fully-convolutional for images size of any multiple of 16 at test time.

C. Loss Function

Instead of optimizing depth z directly, $W_m$ is optimized which is linear to the inverse of the depth. Intuitively, since defocus blur is proportional to the inverse of the depth, estimating depth directly would be highly unstable since even a small perturbation in defocus blur estimation could potentially lead to an arbitrarily large change in depth. Further, since $W_m$ is relative to the depth of the focus plane, it removes an additional degree of freedom that would otherwise need to be estimated. Once $W_m$ is estimated, the depth map may be calculated using (5).

In one or more embodiments, a combination of multiple loss functions may be used $$L_{total} = \lambda_{RMS} L_{RMS} + \lambda_{grad} L_{grad} + \lambda_{CRLB} L_{CRLB} \qquad (8)$$

Empirically, it has been observed that setting the weights of the respective loss functions (if included) as $\lambda_{RMS}=1$, $\lambda_{grad}=1$, and $\lambda_{CRLB}=1e^{-4}$ generates good results. Each loss function 110 is described below in detail.

Root Mean Square (RMS)—In order to force the estimated $W_{cm}$ to be similar to the ground truth $W_m$, a loss term is defined using the RMS error.

$$L_{RMS} = \frac{1}{\sqrt{N}} \| W_m - \hat{W}_m \|_2 \qquad (9)$$

where N is the number of pixels.

Gradient—In a natural scene, it is common to have multiple objects located at different depths, which creates sharp boundaries in the depth map. To emphasize the network to learn these boundaries, an RMS loss on the gradient along both x and y directions is introduced.

$$L_{grad} = \frac{1}{\sqrt{N}} \left( \left\| \frac{\partial W_m}{\partial x} - \frac{\partial \hat{W}_m}{\partial x} \right\| + \left\| \frac{\partial W_m}{\partial y} - \frac{\partial \hat{W}_m}{\partial y} \right\| \right) \qquad (10)$$

Cramer-Rao Lower Bound (CRLB)—The effectiveness of depth-varying PSF to capture the depth information may be expressed using a statistical information theory measure called the Fisher information. Fisher information provides a measure of the sensitivity of the PSF to changes in the 3D location of the scene point. Using the Fisher information function, CRLB may be computed, which provides the fundamental bound on how accurately a parameter (3D location) may be estimated given the noisy measurements. In current problem setting, the CRLB provides a scene-independent characterization of our ability to estimate the depth map. Prior work on 3D microscopy has shown that optimizing a phase mask using CRLB as the loss function provides diverse PSFs for different depths.

The Fisher information matrix, which is a 3×3 matrix in one or more embodiments, is given as $$L_{ij}(\theta) = \sum_{t=1}^{N_p} \frac{1}{PSF_\theta(t) + \beta} \left( \frac{\partial PSF_\theta(t)}{\partial \theta_i} \right) \left( \frac{\partial PSF_\theta(t)}{\partial \theta_j} \right), \qquad (11)$$

where $PSF_\theta(t)$ is the PSF intensity value at pixel t, $N_p$ is the number of pixels in the PSF, and $\theta=(x,y,z)$ corresponds to the 3D location.

The diagonal of the inverse of the Fisher information matrix yields the CRLB vector, which bounds the variance of the 3D location.

$$CRLB = \sigma_i^2 = E(\hat{\theta}_i - \theta_i)^2 \geq [(I(\theta))^{-1}]_{ii} \qquad (12)$$

Finally, the loss is a summation of CRLB for different directions, different depths, and different colors.

$$L_{CRLB} = \sum_{i=x,y,z} \sum_{z \in Z} \sum_{c=R,G,B} \sqrt{CRLB_i(z, c)} \qquad (13)$$

In theory, smaller $L_{CRLB}$ indicates better 3D localization.

D. Training/Implementation Details

The key elements of the training procedure used to perform the end-to-end optimization of the phase mask and reconstruction algorithm are described below.

a) Basis for height maps: Recall that the phase mask is described in terms of a height map. The height map may be described at a resolution of 23×23 pixels. To speed up the optimization convergence, the height map may be constrained further by modeling it using the basis of Zernike polynomials. Specifically, the height map may be constrained to the form $$h(x, y) = \sum_{j=1}^{55} a_j Z_j(x, y) \quad (14)$$

where $\{Z_j(x,y)\}$ is the set of Zernike polynomials. The goal now is to find the optimal coefficient vector $a^{1\times 55}$ that represents the height map of the phase mask.

b) Depth range: The range of $k_G W_m$ may be chosen to be $[-10.5, 10.5]$. The term $k_G$ is the wave vector for green wavelength ($k_G = 2\pi/\lambda_G$; $\lambda_G = 530$ nm) and the range of $k_G W_m$ (hereinafter referred as the normalized $W_m$) may be chosen so that the defocus phase $\varphi^{DF}$ is within a practical range, as calculated by (4).

During the image rendering process, $W_m$ needs to be discretized so that the clean image is blurred layer by layer. There is a tradeoff between the rendering accuracy and speed. For the training, normalized $W_m$ to $[-10:1:10]$ is discretized, so that it has 21 distinct values.

c) Datasets: As described above in the framework, the input data requires both texture and depth information. The NYU Depth dataset is a commonly used RGBD dataset for depth-related problems. However, since Kinect captures the ground-truth depth map, the dataset has issues in boundary mismatch and missing depth. Recently, synthetic data has been applied to geometric learning tasks because it is fast and cheap to produce and contains precise texture and depth. FlyingThings3D is used from Scene Flow Datasets, which includes both all-in-focus RGB images and corresponding disparity map for 2247 training scenes. Each scene contains ten successive frames. The first and last frames in each sequence may be used to avoid redundancies.

To accurately generate 256×256 coded images using PSFs of size 23×23 pixels, all-in-focus images at a resolution 278×278 pixels may be needed. Such data may be generated by cropping patches of appropriate size from the original images (whose resolution is 960×540) with a sliding window of 200 pixels. Further, only select the image whose disparity map ranges from 3 to 66 pixels and convert them to $W_m$ linearly.

With this pre-processing, 5077 training patches, 553 validation patches, and 419 test patches may be obtained. The data is augmented with rotation and flip, as well as brightness scaling randomly between 0.8 to 1.1.

TABLE I

QUANTITATIVE EVALUATION OF ABLATION STUDIES

| Exp. | Learn mask | Initialization | Loss | Error (RMS) |
|---|---|---|---|---|
| A | No | No mask | RMS | 2.69 |
| B | Yes | Random | RMS | 1.07 |
| C | No | Fisher mask | RMS | 0.97 |
| D | Yes | Random | RMS + CRLB | 0.88 |
| E | Yes | Fisher mask | RMS | 0.74 |
| F | Yes | Fisher mask | RMS + CRLB | 0.85 |
| G | Yes | Fisher mask | RMS + gradient | 0.56 | d) Training process: Given the forward model and the loss function, the back-propagation error may be derived using the chain rule in some embodiments. In one or more embodiments of the system, the back-propagation is obtained by the automatic differentiation implemented in TensorFlow. During the training, optimizer with parameters $\beta_1 = 0.99$ and $\beta_2 = 0.999$ is used. Empirically, it has been observed that using different learning rates for the phase mask and depth reconstruction improves the performance, which might be due to the large influence that the phase mask has on the UNet given that even small changes to the mask produces large changes in the coded image. In one or more embodiments, the learning rates for phase mask and depth reconstruction in simulation were $10^{-8}$ and $10^{-4}$, respectively. A learning rate decay of 0.1 was applied at 10K and 20K iterations. It has been observed that the training converges after about 30K iterations. A training minibatch size of 40 is used. Finally, the training and testing were performed on NVIDIA Tesla K80 GPUs.

e) Derivation of back-propagation in the optical layer: During the training process, the height map of the phase mask and the parameters in the U-Net are updated by the back-propagation algorithm. Given the forward model and the loss function, the gradient can be calculated by the chain rule. Although the back-propagation is done by the automatic differentiation implemented in TensorFlow in some embodiments of the system, the analytic form for the optical layer is shown below. This is not trivial since the derivation involves complex-valued variables and element-wise operations.

Without loss of generality, focus on the 1D height map with a single scene depth and a single wavelength. All the coordinates and subscripts are removed. The following equations describe how the height map affects the PSF.

$$\varphi^M = k\Delta n h \quad (15)$$

$$\varphi = \varphi^M + \varphi^{DF} \quad (16)$$

$$P = A \odot \exp(i\phi) \quad (17)$$

$$PSF = |\mathcal{F}P|^2 \quad (18)$$
$$= (\mathcal{F}P)^* \odot (\mathcal{F}P)$$

In the back-propagation step, the error is defined from the digital network as $\delta$, which describes how the final loss function L (defined in Eq. 8) changes when PSF changes.

$$\delta := \frac{\partial L}{\partial PSF} \quad (19)$$

Based on the chain rule, the derivative of L with respect to each variable is shown below. Following are notations used. For a matrix or an operator O, O* is the complex conjugate of O, and $O^T$ is the transpose of O. Particularly for the Fourier operator, $(\mathcal{F}^*)^T = \mathcal{F}^{-1}$. $\odot$ means element-wise multiplication. diag(v) returns a square diagonal matrix with the elements of vector v on the main diagonal. Im(v) returns the imaginary part of v.

$$\frac{\partial L}{\partial \phi} = \frac{\partial L}{\partial PSF} \frac{\partial PSF}{\partial \phi} \quad (20)$$

$$\frac{\partial PSF}{\partial \phi} = \frac{\partial PSF}{\partial (\mathcal{F}P)} \frac{\partial (\mathcal{F}P)}{\partial \phi} + \frac{\partial PSF}{\partial (\mathcal{F}P)^*} \frac{\partial (\mathcal{F}P)^*}{\partial \phi}$$

$$= \text{diag}((FP)^*) F \text{diag}(iP) - \text{diag}(FP) F^* \text{diag}(iP^*) \quad (21)$$

Plugging Eq. 21 into Eq. 20 to get:

$$\frac{\partial L}{\partial \varphi} = [\text{diag}((FP)^*)F\text{diag}(iP) - \text{diag}(FP)F^*\text{diag}(iP^*)]^T \delta \quad (22)$$

$$= \text{diag}(iP)F^T\text{diag}((FP)^*)\delta - \text{diag}(iP^*)F^{-1}\text{diag}(FP)\delta$$

$$= 2\text{Im}[\text{diag}(P^*)F^{-1}\text{diag}(FP)\delta]$$

$$= 2\text{Im}[P^* \odot \mathcal{F}^{-1}((\mathcal{F}P) \odot \delta)]$$

$$\frac{\partial L}{\partial h} = \frac{\partial L}{\partial \phi}\frac{\partial \phi}{\partial h} \quad (23)$$

$$= 2k\Delta n \, \text{Im}[P^* \odot \mathcal{F}^{-1}((\mathcal{F}P) \odot \delta)]$$

This form is also correct for a 2D height map.

In one or more embodiments, the 2D height map is a combination of Zernike polynomials. If the vectorization operator is define as V, then the height map is represented as $$V\{h\}=Za \quad (24)$$

where Z is written in a matrix form.
Then the derivative may be written as $$\frac{\partial L}{\partial a} = \frac{\partial L}{\partial h}\frac{\partial h}{\partial a} \quad (25)$$

$$= Z^T V\left\{\frac{\partial L}{\partial h}\right\}$$

$$= Z^T V\{2k\Delta n\text{Im}[P^* \odot \mathcal{F}^{-1}((\mathcal{F}P) \odot \delta)]\}$$

This gradient may be used to update the learning variable a by gradient descent or Adam optimizer.

III. Simulation

The end-to-end framework learns the phase mask design and reconstruction algorithm in the simulation. During simulation, ablation studies may be performed to identify elements that contribute most to the overall performance as well as identify the best operating point. Finally, compare with other depth estimation methods using simulations.

A. Ablation Studies

Several ablation experiments are carried out to choose the correct parameters in design space of one or more embodiments with clear understanding of the end-to-end system. For all the experiments, the same U-Net architecture is used as discussed above for depth reconstruction. The baseline for all comparison is model (A), a depth-reconstruction-only network trained with a fixed open aperture and RMS loss.

a) Learned vs. fixed mask: In this first experiment, end-to-end framework may be used to learn both the phase mask and the reconstruction layer parameters from randomly initialized values (Exp. B). Exp. C is used for comparison, where the phase mask is fixed to the Fisher mask, which is designed by minimizing $L_{CRLB}$ in the depth range of one or more embodiments, and learn only the reconstruction layer from random initialization.

Figure 3:
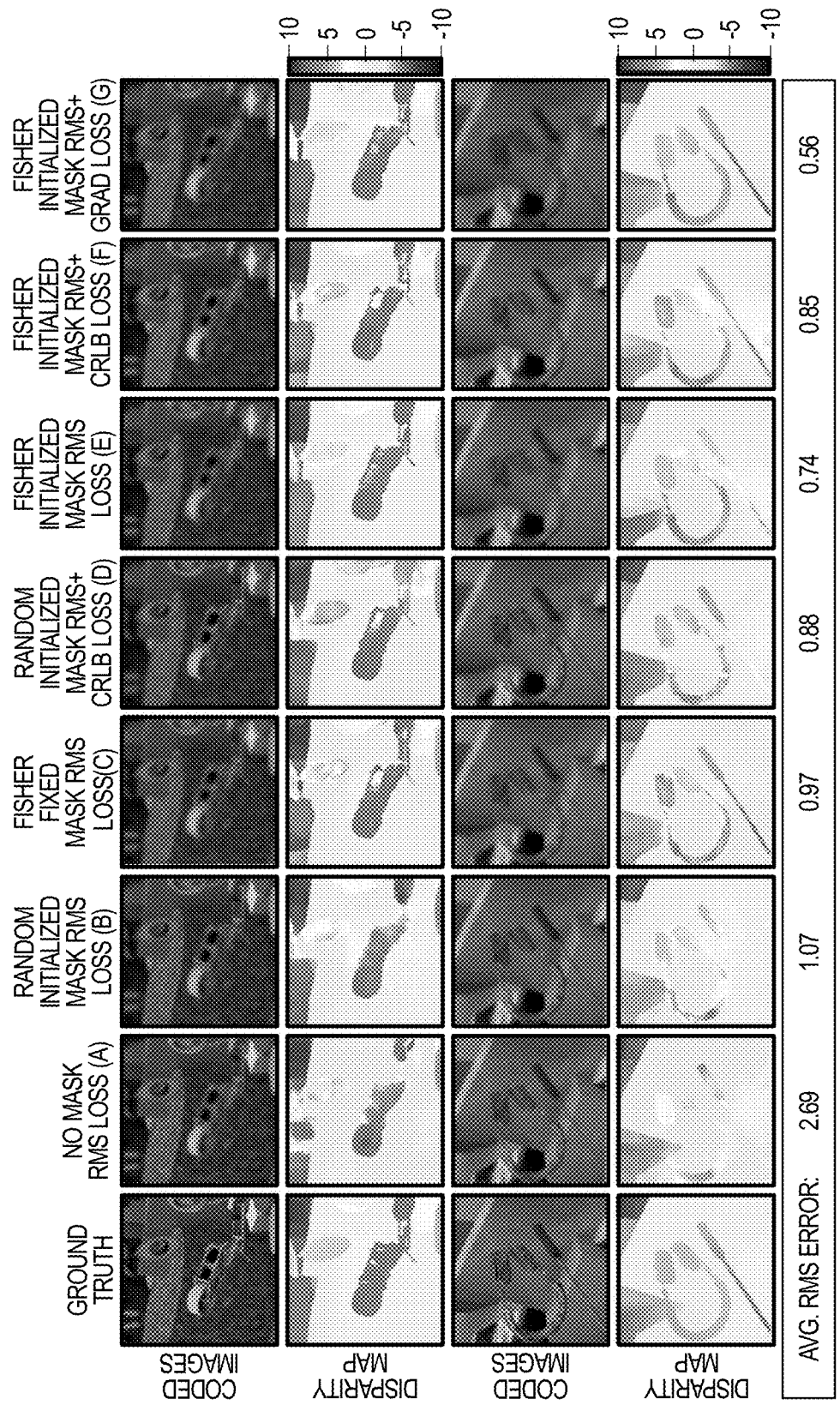
FIG. 3 compares qualitative results from ablation studies of the present disclosure in accordance with one or more embodiments.
Figure 4A:
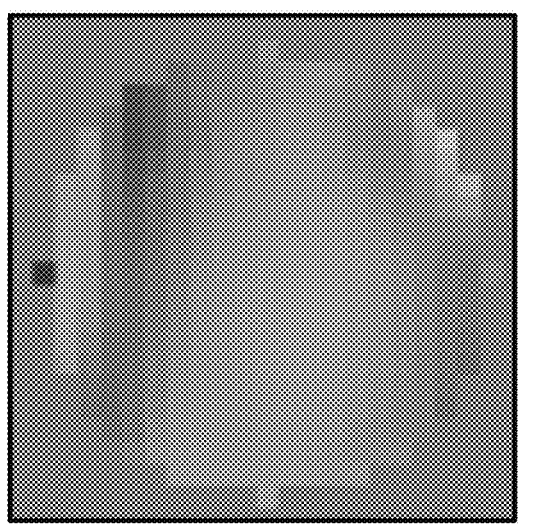
FIGS. 4a-4c compare phase mask height maps from ablation studies of the present disclosure in accordance with one or more embodiments.
Figure 4A:
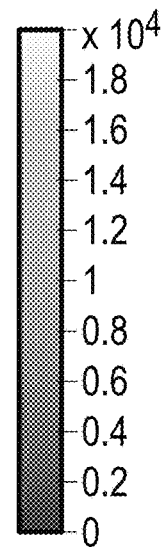
Figure 4B:
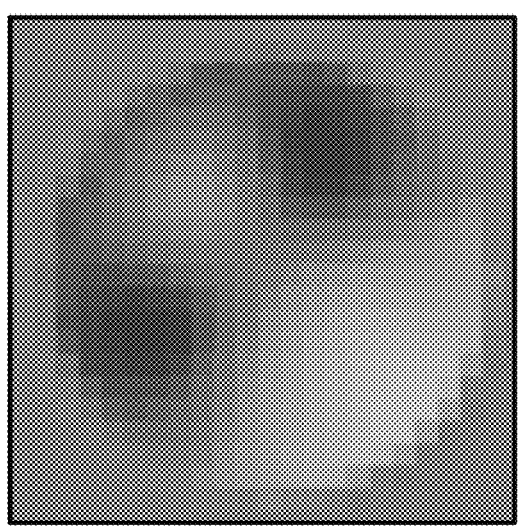
Figure 4B:
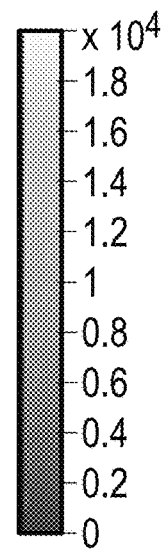

Surprisingly, shown in Table I and FIG.3 (Exp. B vs. C), when learning from scratch (random phase mask parameters), the end-to-end learned masks (B) underperforms the Fisher mask that was designed using a model-based approach (C). Thus, it is observed that the CRLB cost is very powerful by itself and leads to a phase mask that is well suited for depth estimation; this is expected given the performance of prior work that exploits the CRLB cost. Secondly, a random initialization fails to converge to the desired solution in part due to the highly non-convex nature of the optimization problem and the undue influence of the initialization. FIG. 4 shows the visualized corresponding phase mask height map, where FIG. 4a shows the mask learned from scratch in Exp. B, and FIG. 4b shows the fixed Fisher in Exp. C.

b) Effect of initialization conditions: Careful initialization is explored if it would help in improving overall performance. Instead of initializing with random values in Exp. B, the mask is initialized as a Fisher mask in Exp. E, and perform end-to-end optimization of both the mask design and the reconstruction network (there is no constraint forcing the optical network to generate masks that are close to the Fisher mask). Interestingly, under such an initialization, the end-to-end optimization improves the performance compared to the randomly initialized mask (B) by a significant margin (1.07 vs. 0.74 in RMS), and it also out-performs the fixed Fisher mask (Exp. C) noticeably (0.97 vs. 0.74 in RMS), suggesting the CRLB-model-based mask design may be further improved by data-driven fine-tuning. This is reasonable given that the model-based mask design does not optimize directly on the end objective—namely, a high-quality precise depth map that may capture both depth discontinuities and smooth depth variations accurately. Fisher mask is the optimal solution for 3D localization when the scene is sparse. However, most real-world scenes are not sparse and hence optimizing for the actual depth map allows beating the performance of the Fisher mask.

The use of Fisher mask to initialize the network might raise the concern whether the approach is still end-to-end. Although, initializing a network from designed weights instead of from scratch is a common practice in deep learning. Likewise, one or more embodiments incorporate domain knowledge and use a model-based approach in designing the initialization condition of optical layers.

c) Effect of loss functions: Finally, different combinations of Losses discussed above are compared with the Fisher mask as the initialization (E, F, and G). It is observed that RMS with gradient loss (G) gives the best results. The performance of randomly initialized mask with RMS and CRLB loss in D is shown below.

B. Operating Point with Best Performance

Figure 4C:
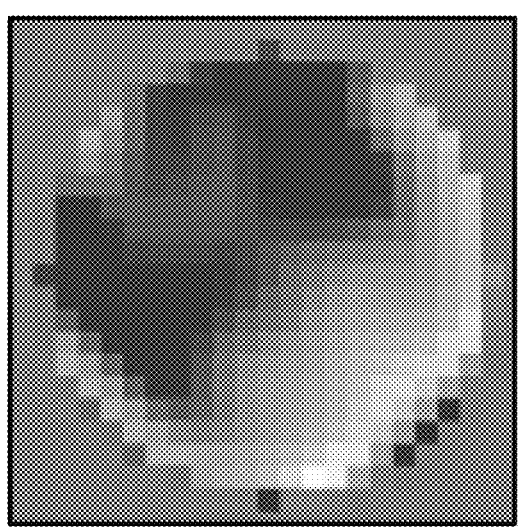
Figure 4C:
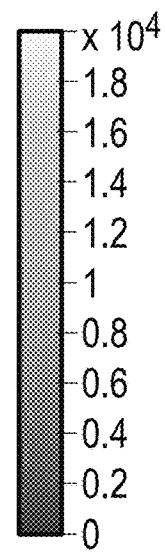
Figure 5:
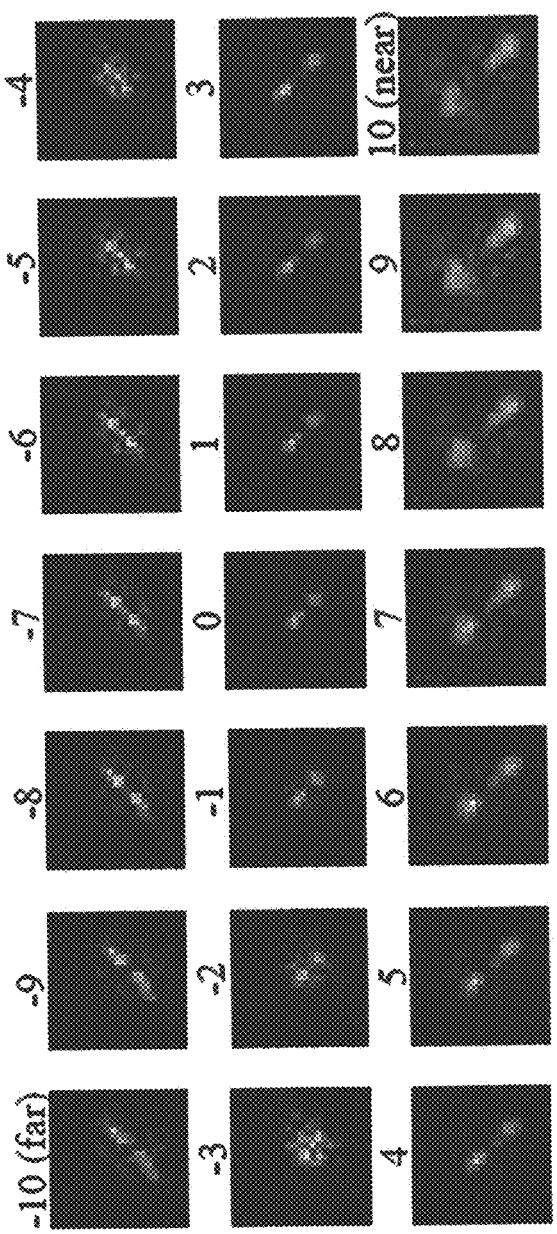
FIG. 5 compares simulated point spread functions (PSFs) of optimal phase mask of the present disclosure in accordance with one or more embodiments.
Figure 6:
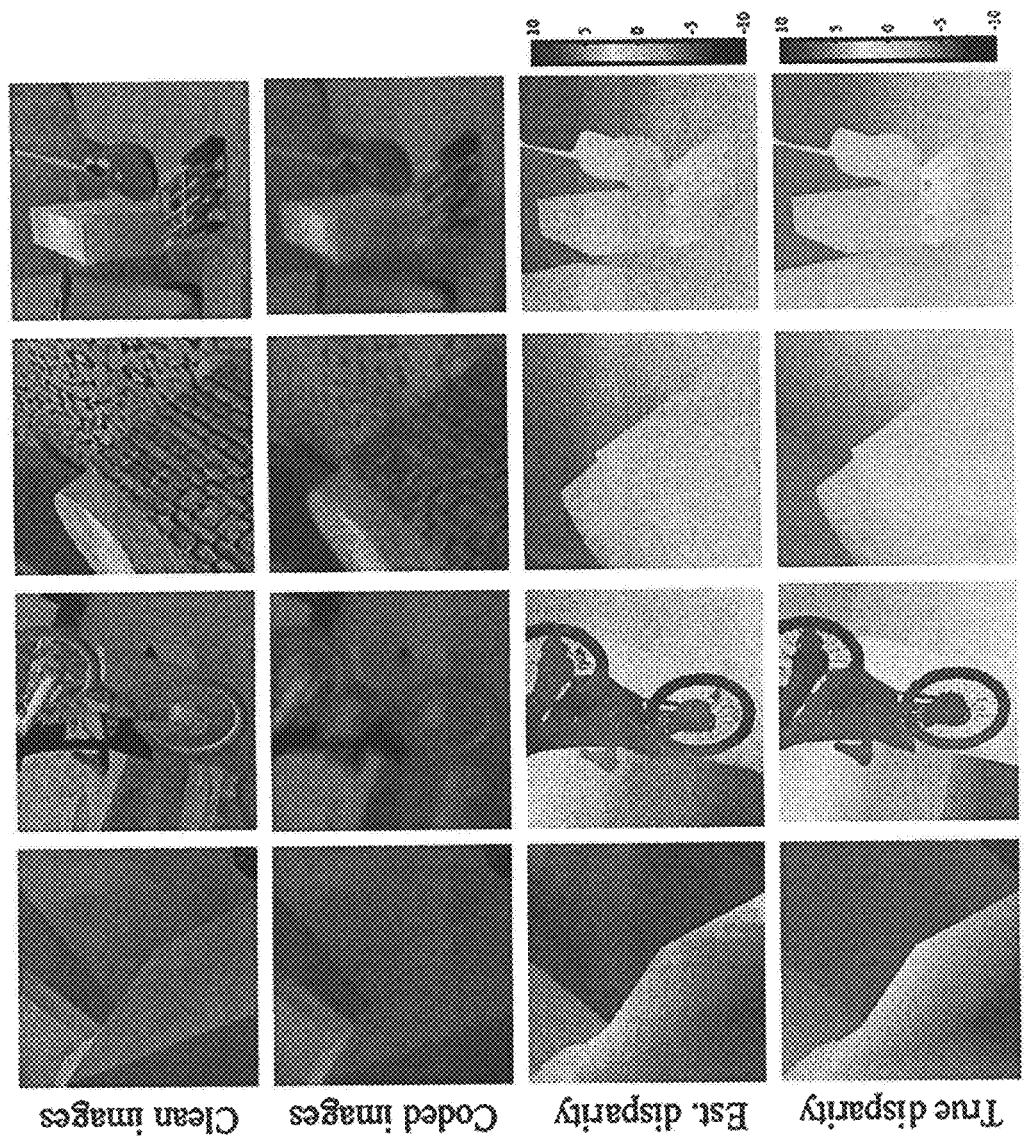
FIG. 6 compares simulated results with the best phase mask of the present disclosure in accordance with one or more embodiments.

FIG. 4c shows the best phase mask design based on the ablation study. It shares some similarity with the Fisher mask since the Fisher mask is taken as initialization. But the mask is further optimized based on the depth map from the data. FIG. 5 displays depth-dependent PSFs in the range [−10:1:10] of normalized $W_m$. These PSFs have large variability across different depths for improving the performance of depth estimation. More simulation results are shown in FIG. 6.

C. Comparisons with the State-of-the-Art

The result with state-of-the-art passive, single-viewpoint depth estimation methods are compared.

TABLE II

COMPARISON WITH AMPLITUDE MASK DESIGN

| Mask design | LRMS |
|---|---|
| Reference#1 | 1.04 |
| Reference#2 | 1.08 |
| Sample | 0.56 | a) Coded amplitude masks: There are two well-known amplitude masks for depth estimation. Levin et al. (Reference #1 710) design a mask by maximizing the blurry image distributions from different depths using Kullback-Leibler divergence. Veeraraghavan et al. (Reference #2 720) select the best mask by maximizing the minimum of the discrete Fourier transformation magnitudes of the zero padded code. To make a fair comparison between their masks and the proposed mask (sample 730), blurry image datasets are rendered based on each mask with the same noise level ($\sigma=0.01$). Since UNet is a general pixel-wise estimation network, it is used with same architecture introduced above for depth reconstruction. Parameters in the U-Net are learned for each dataset using RMS and gradient loss.

Figure 7:
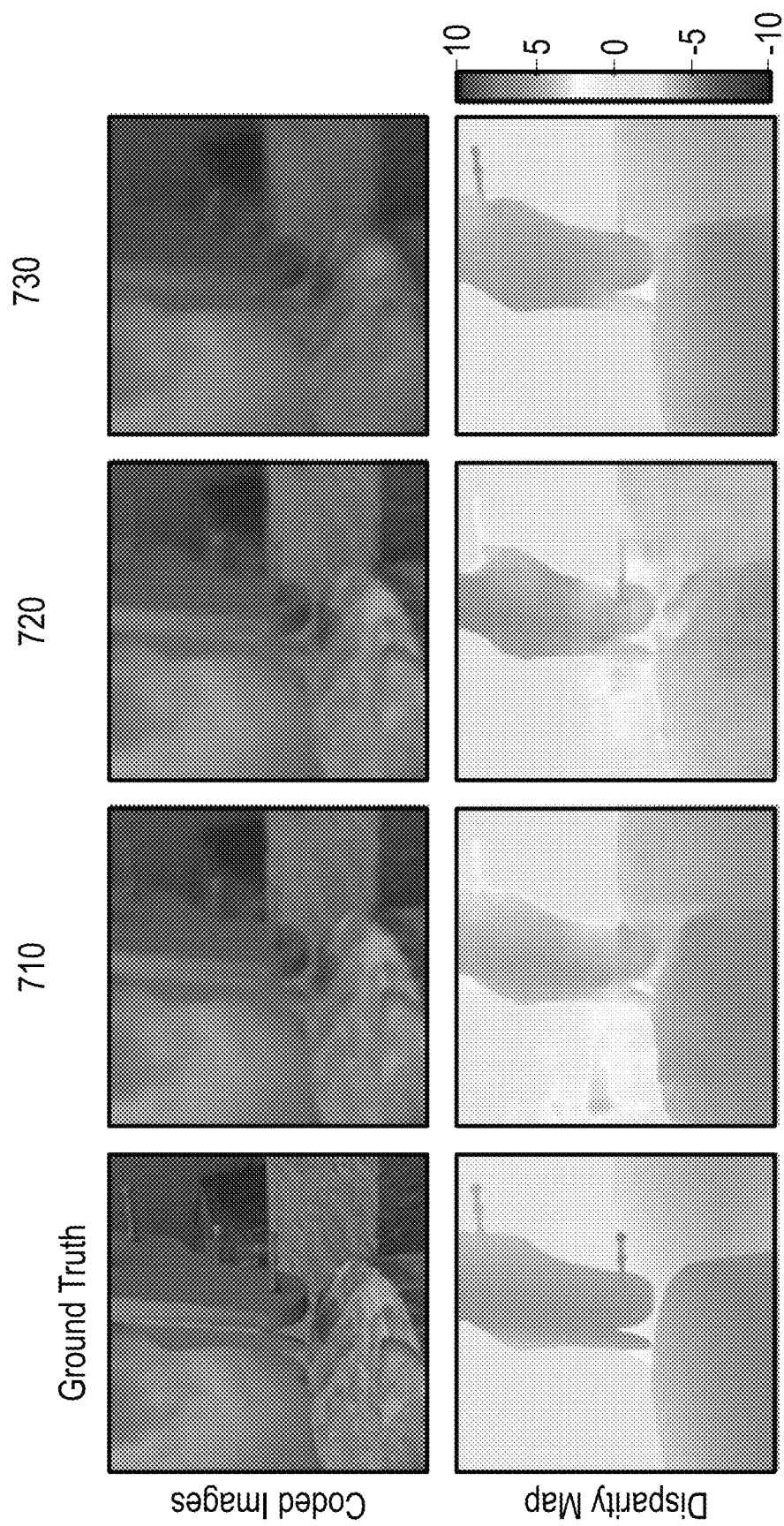
FIG. 7 compares depth estimation with coded amplitude masks in accordance with one or more embodiments.
Figure 8:
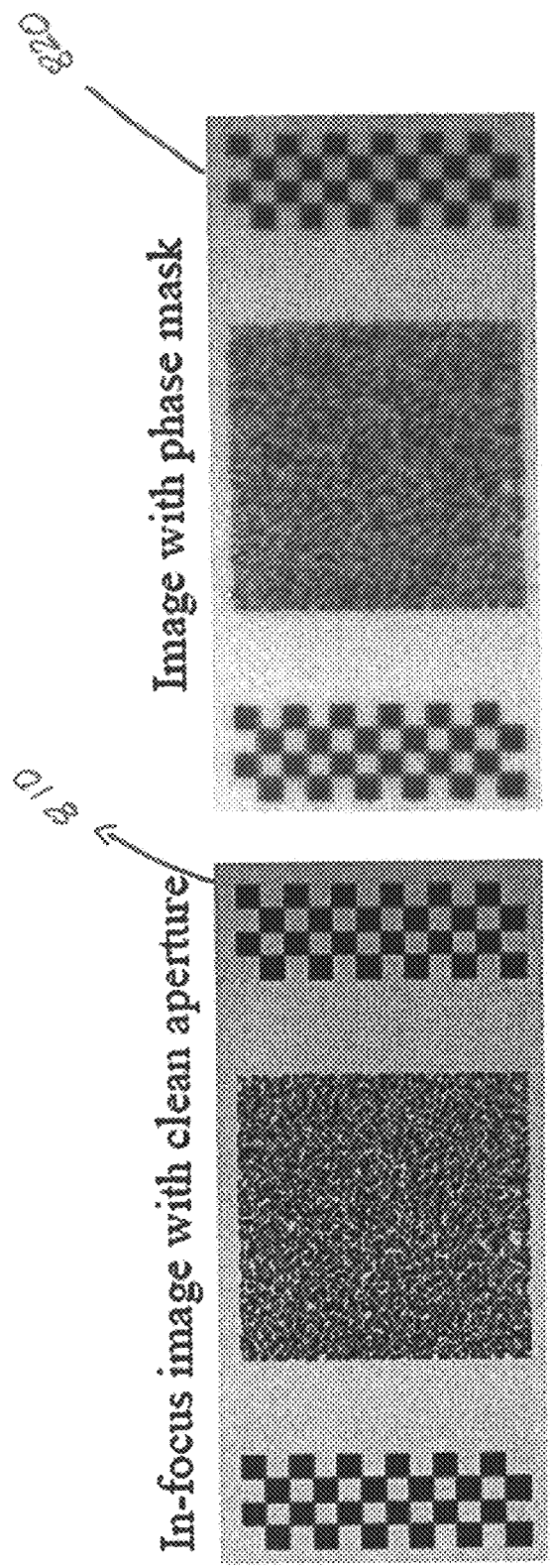
FIG. 8 shows calibration target for PSF estimation in accordance with one or more embodiments.
Figure 9:
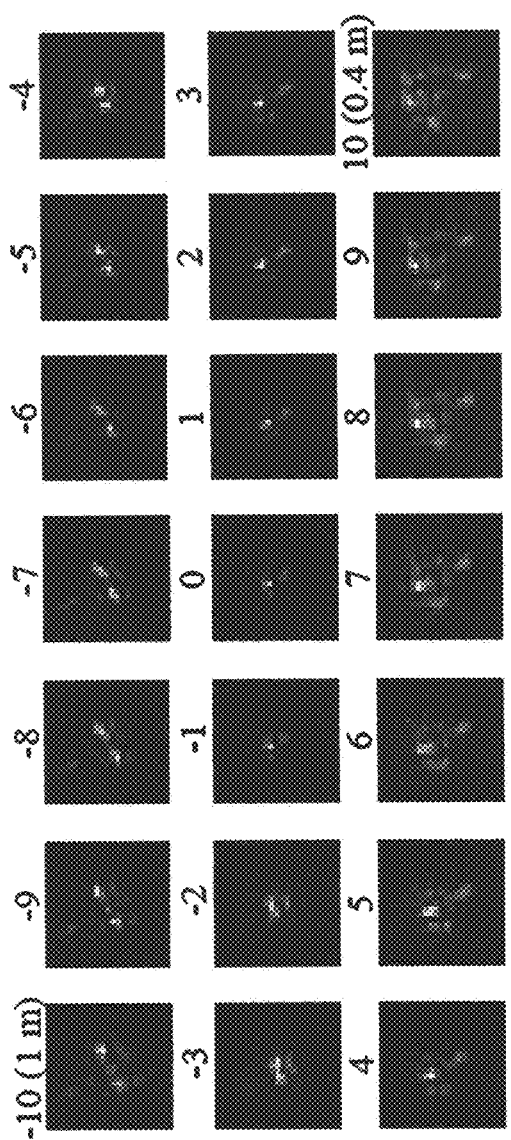
FIG. 9 shows calibrated PSFs of the fabricated phase mask in accordance with one or more embodiments.

The quantitative results are shown in Table II and qualitative results are shown in FIG. 7. The sample 730 mask offers the best result with the smallest RMS error. One key reason is that the reference #1 710 and reference #2 720 amplitude masks only change the scaling factor of PSF at different depths, while the sample 730 (proposed mask) creates a more dramatic difference in PSF at different depths.

b) Two-ring phase mask: Recently, Haim et al. propose a two-ring phase mask for depth estimation. To compare the performance, their dataset "TAU-Agent" is used and the same parameters described in their paper. Performance is evaluated by the $L_1$ loss of $W_m$. As shown in Table III, both reconstruction network and phase mask of one or more embodiments contribute to achieving smallest estimation error.

TABLE III

COMPARISON WITH THE TWO-RING PHASE MASK [4]

| Method | $|W_m - \hat{W}_m|$ |
|---|---|
| Two-ring mask + Haim's network | 0.6 |
| Two-ring mask + U-Net | 0.51 |
| Our Optimized Mask + U-Net | 0.42 | c) Semantics-based single image depth estimation: To compare the performance of proposed methods in one or more embodiments with other deep-learning-based depth estimation methods using a single all-focus image, evaluation experiments are performed on standard NYU Depth V2 datasets. The default training/testing splits provided by the datasets are used. The size of training and testing images are re-sized from 640×480 to 320×240 following the data augmentations the common practice. The comparison of proposed methods in one or more embodiments with other state-of-the-art passive single image depth estimation results are shown in Table IV. The standard performance metrics used by all the aforementioned works for comparison are used, including linear root mean square error (RMS), absolution relative error (REL), logarithm-scale root mean square error (Log 10) and depth estimation accuracy within a threshold margin ($\delta$ within 1.25, $1.25^2$ and $1.25^3$ away from the ground truth). As one can see, better performance is achieved in every metrics category for depth estimation error and accuracy, which suggests that the added end-to-end optimized phase mask does help improve the depth estimation. Moreover, one or more embodiments don't have the issue of scaling ambiguity in depth like those semantics based single-image depth estimation methods since PSFs are based on absolute depth values.

IV. Experiments on Real Hardware

Figure 11:
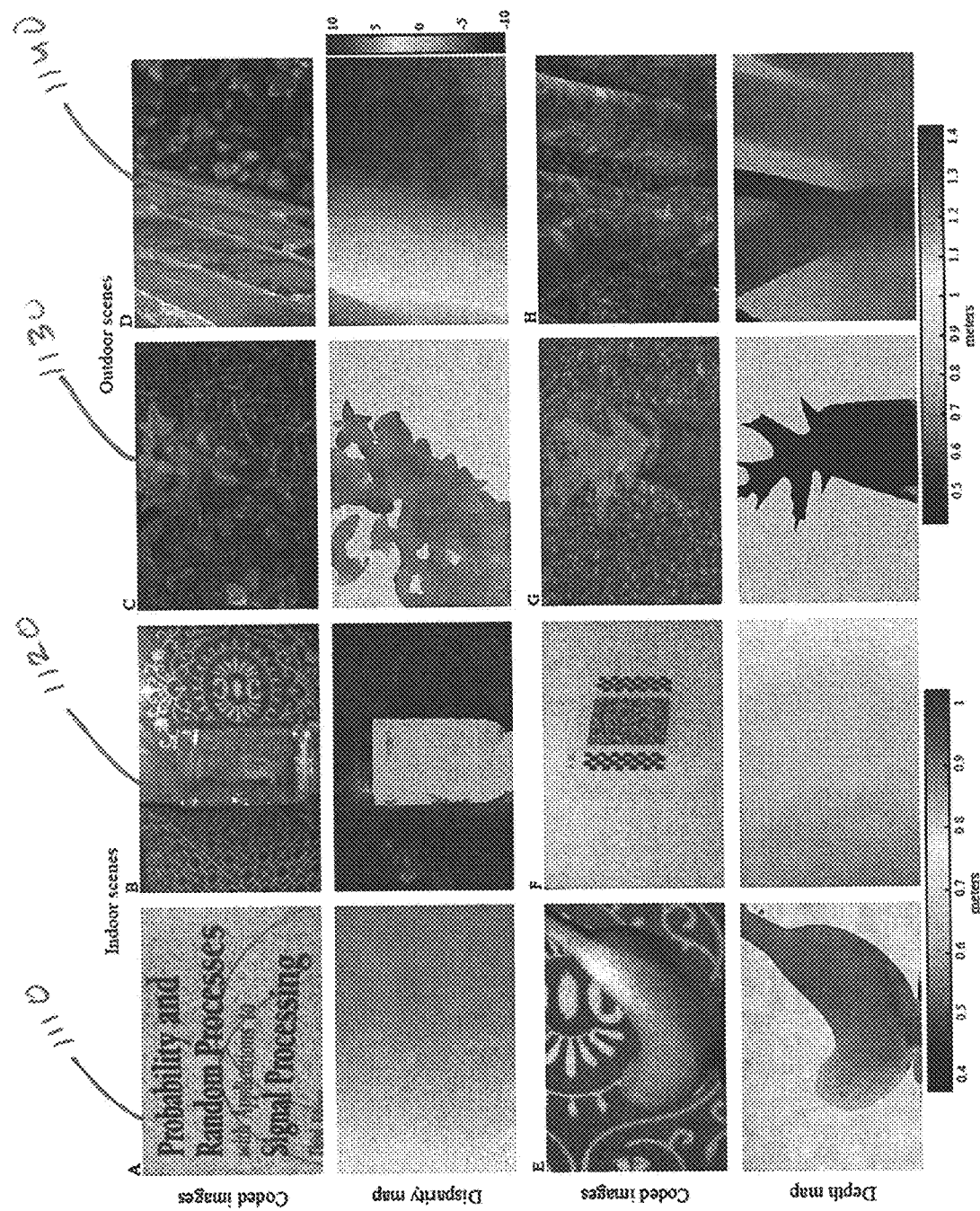
FIG. 11 shows real-world results and compares results of various scenarios in accordance with one or more embodiments.

In some embodiments, the phase masks learned through end-to-end optimization of one or more embodiments are fabricated, and evaluated its performance on a range of real-world scenes. The experiment details are discussed below, and the qualitative results are shown in FIG. 11.

A. Experiment Setup

In the experiment, a Yongnuo 50 mm f/1.8 standard prime lens is used, which is easy to access the aperture plane. The sensor is a 5472×3648 machine vision color camera (BFSPGE-200S6C-C) with 2.4 µm pixel size. The diameter of the mask phase is set to be 2.835 mm. Thus, the simulated pixel size is about 9.4 µm for the green channel, which corresponds to 4 pixels in the actual camera of some embodiments. For each 4×4 region, grouped it to be one pixel with RGB channels by averaging each color channel based on the Bayer pattern, therefore the final output resolution of our system is 1344×894.

B. Phase Mask Fabrication

The size of the designed phase mask is 21×21, with each grid corresponding to a size of 135 µm×135 µm. The full size of the phase mask is 2.835 mm×2.835 mm.

The phase mask was fabricated using two-photon lithography 3D printer (Photonic Professional GT, Nanoscribe GmbH). For a reliable print, the height map of the designed phase mask was discretized into steps of 200 nm. The phase mask was printed on a 170 µm thick, 30 mm diameter glass substrate using Nanoscribe's IP-L 780 photoresist in a direct laser writing configuration with a 63× microscope objective lens. The glass substrate was then cut to a smaller size to fit into the camera lens' aperture. Close-up of the phase mask 206 in the camera lens aperture 204 is shown in FIG. 2.

C. PSF Calibration

Although the depth-dependent PSF response of the phase mask is known from simulation, the prototype camera in one or more embodiments calibrated to account for any mismatch born out of physical implementation such as aberrations in fabricated phase mask and phase mask aperture alignment. An optimization based approach adopted where the PSFs from a set of sharp and coded image pairs of a calibration pattern are estimated.

Estimating the PSF may be posed as a deconvolution problem, where both a sharp image and a coded image of the same calibration target are given. The calibration target used in some embodiments is a random binary pattern that was laser-printed on paper. Two identical camera lenses were used, one without the phase mask to capture the sharp image and the other with the phase mask in the aperture to capture the coded image. Image pairs are then obtained for each depth plane of interest. The lens focus was adjusted at every depth plane to capture sharp images while the focus of the camera lens with the phase mask assembly was kept fixed. Checkerboard pattern was used around the calibration pattern to assist in correcting for any misalignment between the sharp and the coded image.

For a particular depth plane, let I be the sharp image and J be the coded image taken using the phase mask. The PSF $p_{opt}$ may be estimated by solving the following convex optimization problem $$p_{opt} = \underset{p}{\mathrm{argmin}} \|I * p - s \cdot J\|_2^2 + \lambda \|\nabla p\|_1 + \mu \|1^T p - 1\|_2^2 \quad (25)$$

where the first term is a least-squares data fitting term ('*' denotes convolution), and the scalar $s=\Sigma_{(m,n)}I(m,n)/\Sigma_{(m,n)}J(m,n)$ normalizes the difference in exposure between the image pairs. The second term constraints the gradients of the PSF to be sparse and the third term enforces an energy conservation constraint. The above optimization problem may be solved using first-order primaldual algorithm. The PSF estimation is performed for each color channel and each depth plane independently.

D. Fine-Tuning the Digital Network

Figure 10:
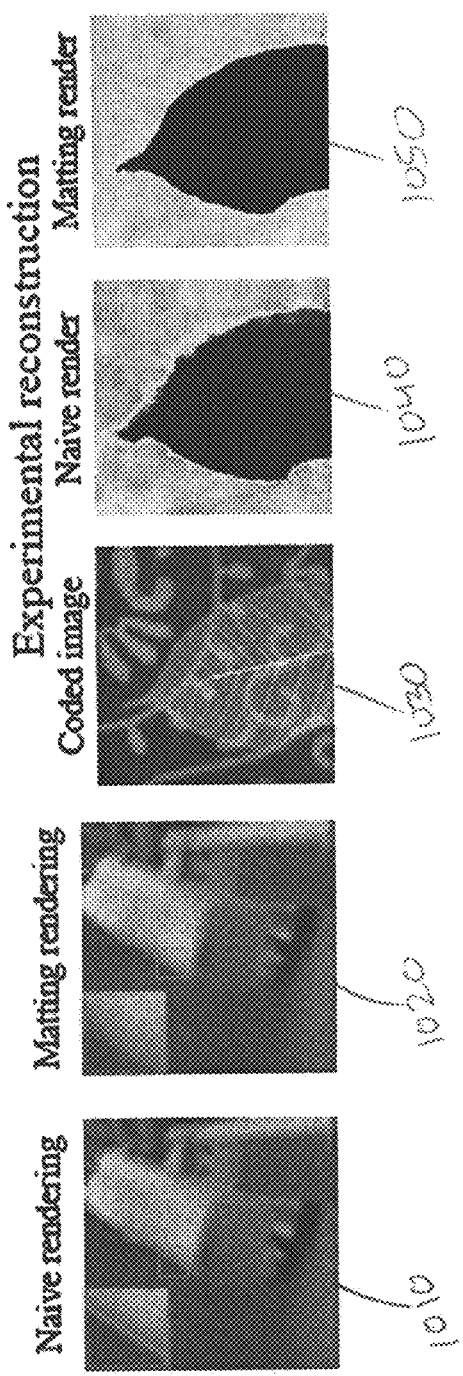
FIG. 10 shows fine-tune digital network with matting-based rendering in accordance with one or more embodiments.

When training for phase mask profile using our framework, naive rendering to simulate the coded image used as described above. Such a rendering process is fast, allowing for multiple cycles of rendering and sufficient to explain most out-of-focus regions of the scene. However, without blending between the depth layers, the naive rendering is not realistic at depth boundaries. Hence, the digital reconstruction network trained using naive rendering shows artifacts at object boundaries as shown in FIG.10.

To improve the performance of the depth reconstruction network, the optimized phase mask was fixed to retrain the digital network with a matting-based rendering technique. Matting for each depth layer was computed by convolving the corresponding PSF with the depth layer mask. The coded image was then composited, ordered from farther blurred layers to nearer blurred layers. The layers were linearly blended using the normalized matting weights. Since the PSFs are fixed, rendering of all the coded imaged may be created apriori and fed into the training of the depth reconstruction network. The use of closer-to-reality matting-based rendering improved the experimental reconstructions in some embodiments significantly at the object boundaries, as shown in FIG. 10.

E. Real-World Results

Using the hardware prototype built in one or more embodiments, the depth of the real world scenes are acquired. The results are shown in FIG.11. As one can observe, the proposed system is robust to lighting condition as reasonable depth estimation for both indoor scenes (A, B, E, and F) and outdoor scene (C, D, G, and H) are produced. Both smoothly changing surface (A, D and F) and sharp object boundaries (B, C, E, G, and H) are nicely portrayed. Special cases of a transparent object (B) and texture-less areas (E and F) are also nicely handled.

Figure 12A:
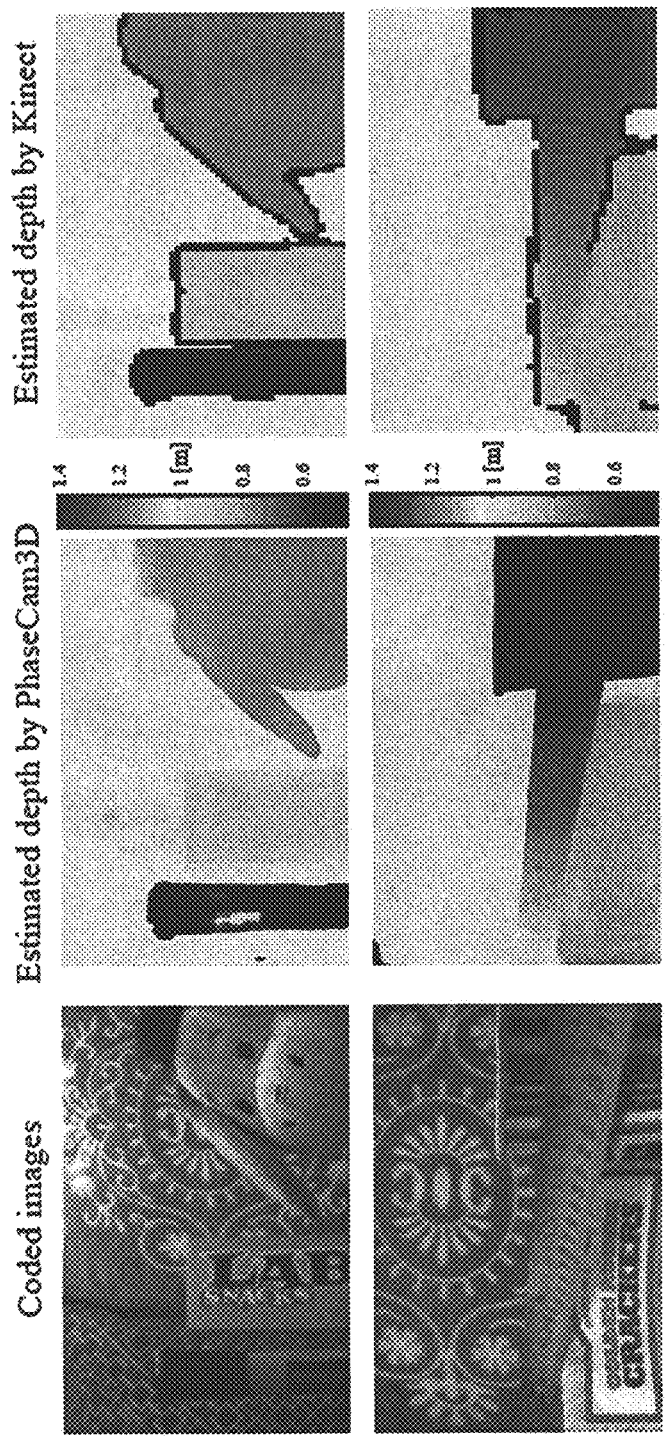
FIG. 12a shows depth estimation performance comparison between the present disclosure and the Microsoft Kinect V2 in accordance with one or more embodiments.

In addition, given the Microsoft Kinect V2 is the one of the best ToF-based depth camera available on the mainstream market, depth estimation results of one or more embodiments are shown against the Kinect results in FIG. 12a. As one can see, the Kinect indeed output smoother depth on flat surfaces than the proposed system, however, in some embodiments, method handles the depth near the object boundary better than Kinect.

Figure 12B:
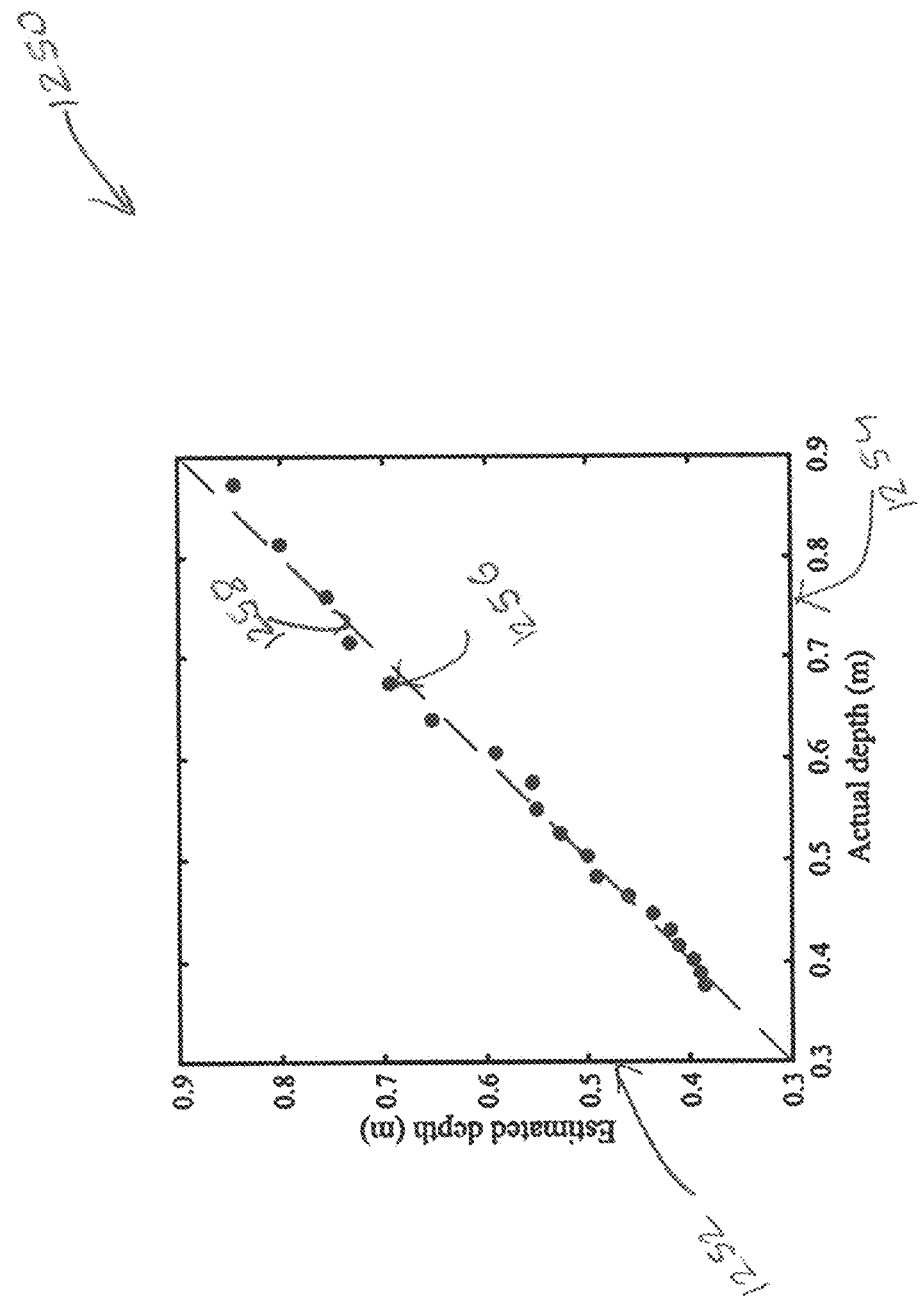
FIG. 12b shows depth accuracy evaluation of the present disclosure by capturing targets at known depths in accordance with one or more embodiments.

To validate the depth-reconstruction accuracy of the prototype, a planar target is captured placed at various known depths. The depth of the target is computed and then compared against the known depths. As shown in FIG. 12b, the depth may be reliably estimated throughout the entire range.

For comparison, the Fisher mask is also tested in experiments. The results show that the proposed mask of one or more embodiments provides better depth estimation.

Figure 13A:
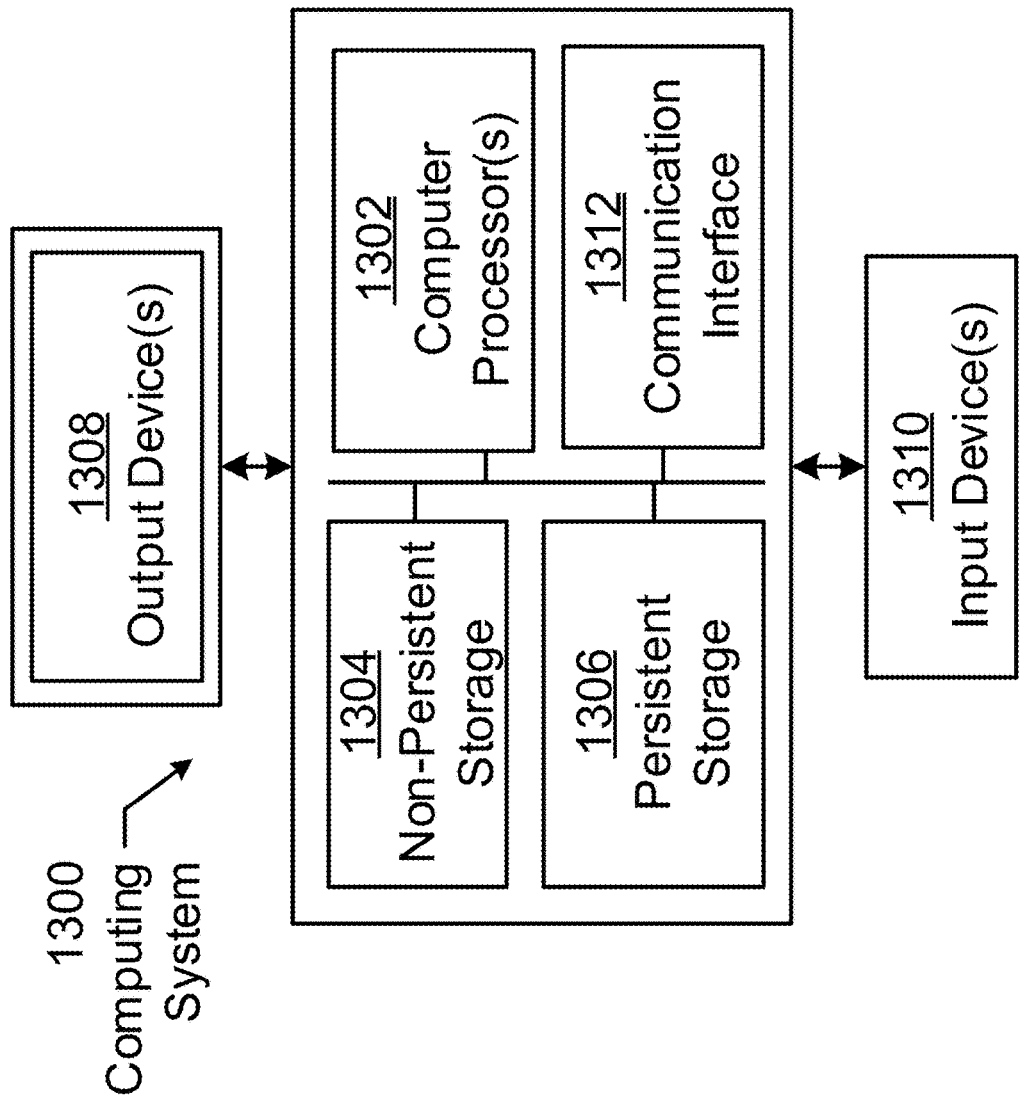
FIGS. 13a and 13b show a computing system in accordance with one or more embodiments.

Embodiments may be implemented on a computing system. Any combination of mobile, desktop, server, router, switch, embedded device, or other types of hardware may be used. For example, as shown in FIG. 13a, the computing system (1300) may include one or more computer processors (1302), non-persistent storage (1304) (e.g., volatile memory, such as random access memory (RAM), cache memory), persistent storage (1306) (e.g., a hard disk, an optical drive such as a compact disk (CD) drive or digital versatile disk (DVD) drive, a flash memory, etc.), a communication interface (1312) (e.g., Bluetooth interface, infrared interface, network interface, optical interface, etc.), and numerous other elements and functionalities.

The computer processor(s) (1302) may be an integrated circuit for processing instructions. For example, the computer processor(s) may be one or more cores or micro-cores of a processor. The computing system (1300) may also include one or more input devices (1310), such as a touchscreen, keyboard, mouse, microphone, touchpad, electronic pen, or any other type of input device.

The communication interface (1312) may include an integrated circuit for connecting the computing system (1300) to a network (not shown) (e.g., a local area network (LAN), a wide area network (WAN) such as the Internet, mobile network, or any other type of network) and/or to another device, such as another computing device.

Further, the computing system (1300) may include one or more output devices (1308), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (1302), non-persistent storage (1304), and persistent storage (1306). Many different types of computing systems exist, and the aforementioned input and output device(s) may take other forms.

Software instructions in the form of computer readable program code to perform embodiments of the disclosure may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the disclosure.

The computing system (1300) in FIG. 13a may be connected to or be a part of a network.

Figure 13B:
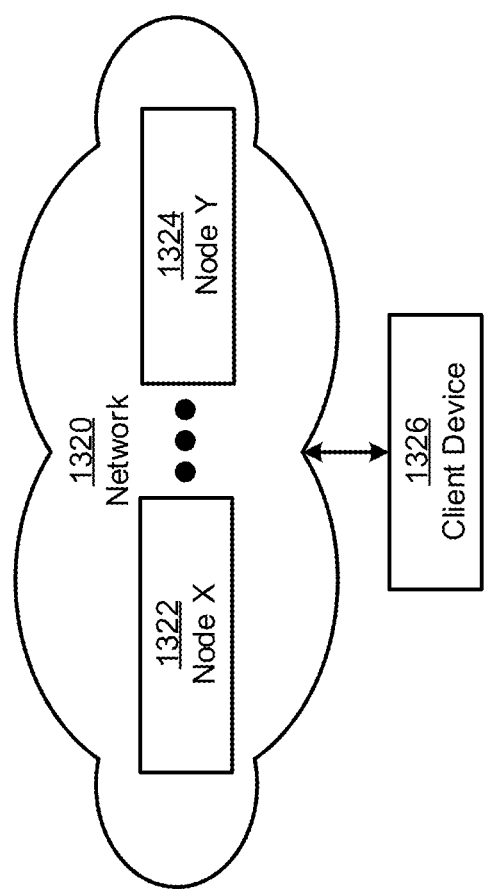

For example, as shown in FIG. 13b, the network (1320) may include multiple nodes (e.g., node X (1322), node Y (1324)). Each node may correspond to a computing system, such as the computing system shown in FIG. 13a, or a group of nodes combined may correspond to the computing system shown in FIG. 13a. By way of an example, embodiments of the disclosure may be implemented on a node of a distributed system that is connected to other nodes. By way of another example, embodiments of the disclosure may be implemented on a distributed computing system having multiple nodes, where each portion of the disclosure may be located on a different node within the distributed computing system. Further, one or more elements of the aforementioned computing system (1300) may be located at a remote location and connected to the other elements over a network.

Although not shown in FIG. 13b, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (1322), node Y (1324)) in the network (1320) may be configured to provide services for a client device (1326). For example, the nodes may be part of a cloud computing system. The nodes may include functionality to receive requests from the client device (1326) and transmit responses to the client device (1326). The client device (1326) may be a computing system, such as the computing system shown in FIG. 13a. Further, the client device (1326) may include and/or perform all or a portion of one or more embodiments of the disclosure.

The computing system or group of computing systems described in FIGS. 13a and 13b may include functionality to perform a variety of operations disclosed herein. For example, the computing system(s) may perform communication between processes on the same or different systems. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until the server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, one authorized process may mount the shareable segment, other than the initializing process, at any given time.

Other techniques may be used to share data, such as the various data described in the present application, between processes without departing from the scope of the disclosure. The processes may be part of the same or different application and may execute on the same or different computing system.

Rather than or in addition to sharing data between processes, the computing system performing one or more embodiments of the disclosure may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the disclosure, may extract one or more data items from the obtained data. For example, the extraction may be performed as follows by the computing system (1300) in FIG. 13a. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail—such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 13a, while performing one or more embodiments of the disclosure, may perform data comparison. Data comparison may be used to compare two or more data values (e.g., A, B). For example, one or more embodiments may determine whether A>B, A=B, A !=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments of the disclosure, A and B may be vectors, and comparing A with B includes comparing the first element of vector A with the first element of vector B, the second element of vector A with the second element of vector B, etc. In one or more embodiments, if A and B are strings, the binary values of the strings may be compared.

The computing system in FIG. 13a may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 13a may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system of FIG. 13a and the nodes and/or client device in FIG. 13b. Other functions may be performed using one or more embodiments of the disclosure.

While the disclosure has been described with respect to a limited number of embodiments, those skilled in the art, having benefit of this disclosure, will appreciate that other embodiments can be devised which do not depart from the scope of the disclosure as disclosed herein. Accordingly, the scope of the disclosure should be limited only by the attached claims.

What is claimed is:

1. A method for a passive single-viewpoint 3D imaging system, comprising:
  capturing an image from a camera, the camera having one or more phase masks;
  using a reconstruction algorithm, for estimation of a 3D or depth image,
  wherein the reconstruction algorithm comprises:
    building a differentiable forward model with an optical layer and a reconstruction network,
    wherein in the optical layer, a physics-based model simulates a plurality of coded images captured on a sensor with a phase mask,
    wherein in the reconstruction network, a neural network produces a depth map from the coded images, and
    wherein the optical layer takes in an all-in-focus image and the corresponding depth map as inputs and outputs a physically accurate coded intensity image.

2. The method of claim 1, wherein the phase masks are separately fabricated and inserted between a camera lens and an image sensor.

3. The method of claim 1 wherein the phase masks are integrated into the camera lens assembly and fabricated as a single optimized modified optical assembly.

4. The method of claim 1, wherein the phase masks are integrated into the camera lens assembly and fabricated as either single or multiple optimized modified optical assembly.

5. The method of claim 1, wherein a plurality of parameters of the neural network are trained using a red green blue depth (RGBD) dataset to optimize a height map of the phase mask and parameters in the neural network.

6. The method in claim 5, wherein the training process comprises:
    calibrating a plurality of point spread functions (PSFs) at different depths;
    simulating the plurality of coded images with the calibrated PSFs to fine-tune the neural network; and
    recovering the corresponding depth map by capturing and passing a plurality of images through the neural network, wherein the neural network is a U-Net.

7. The method of claim 1, wherein the reconstruction algorithm is based on optimization of an energy function and wherein the reconstruction algorithm returns both the 3D or depth image and a 2D intensity image.

8. The method of claim 5, further comprising optimizing, both parameters of the optical layer and the reconstruction network, based on a loss defined between an estimated depth and a ground truth depth.

9. The method of claim 1, further comprising fabricating the optimized phase mask using photolithography method.

10. The method of claim 9, further comprising printing the optimized phase mask on a glass substrate and cutting the glass substrate to a smaller size to fit into the aperture plane of the camera.

11. A system for a passive and single-viewpoint 3D imaging system, comprising:
    a camera; and
    an optimized phase mask placed in an aperture plane of the camera,
    wherein the optimized phase mask and a reconstruction algorithm allow the system to estimate a 3D or depth image,
    wherein the reconstruction algorithm comprises a computer processor configured to:
        build a differentiable forward model with an optical layer comprising a physics-based model to simulate a plurality of coded images captured on the sensor with the phase mask and a neural network to produce a depth map from the coded images;
        train a framework with a synthetic red green blue depth (RGBD) dataset to optimize a height map of the phase mask and parameters in the neural network;
        calibrate a plurality of point spread functions (PSFs) at different depths;
        simulate the plurality of coded images with the calibrated PSFs to fine-tune the neural network; and
        recover the corresponding depth map by capturing and passing a plurality of images through the neural network.

12. The system of claim 11, wherein the optimized phase mask is fabricated using a 3D printer using photolithography.

13. The system of claim 11, wherein the optical layer takes in an all-in-focus image and the corresponding depth map as inputs and outputs a physically accurate coded intensity image.

14. The system of claim 11, wherein both parameters of the optical layer and the reconstruction network are optimized based on a loss defined between an estimated depth and a ground truth depth.

15. The system of claim 11, wherein the optimized phase mask is printed on a glass substrate and the glass substrate cut to a smaller size to fit into the aperture plane of the camera.

16. A non-transitory computer readable medium storing instructions, the instructions executable by a computer processor and comprising functionality for:
    building a differentiable forward model with an optical layer and a reconstruction network,
    wherein in the optical layer, a physics-based model simulates a plurality of coded images captured on a sensor with a phase mask, and
    wherein in the reconstruction network, a neural network produces a depth map from the coded images;
    training a framework with a red green blue depth (RGBD) dataset to optimize a height map of the phase mask and parameters in the neural network;
    fabricating an optimal phase mask using photolithography method and placing in an aperture plane of a camera;
    calibrating a plurality of point spread functions (PSFs) at different depths;
    simulating the plurality of coded images with the calibrated PSFs to fine-tune the neural network; and
    recovering the corresponding depth map by capturing and passing a plurality of images through the neural network.

17. The non-transitory computer readable medium of claim 16, the instructions further comprising functionality for optimizing, both parameters of the optical layer and the reconstruction network, based on a loss defined between an estimated depth and a ground truth depth.

* * * * *